(12) United States Patent
Yin et al.

(10) Patent No.: US 12,057,785 B1
(45) Date of Patent: Aug. 6, 2024

(54) THREE-LEVEL CONVERTER AND CONTROL METHOD THEREOF

(71) Applicant: FOXESS CO., LTD, Wenzhou (CN)

(72) Inventors: Cong Yin, Wenzhou (CN); Jian Peng, Wenzhou (CN)

(73) Assignee: Foxess Co., Ltd, Wenzhou (CN)

( * ) Notice: Subject to any disclaimer, the term of this patent is extended or adjusted under 35 U.S.C. 154(b) by 0 days.

(21) Appl. No.: 18/653,852

(22) Filed: May 2, 2024

(30) Foreign Application Priority Data

Jun. 14, 2023 (CN) .......................... 202310704136.X

(51) Int. Cl.
*H02M 7/483* (2007.01)
*H02M 7/539* (2006.01)

(52) U.S. Cl.
CPC ........... *H02M 7/483* (2013.01); *H02M 7/539* (2013.01)

(58) Field of Classification Search
CPC .... H02M 7/483; H02M 7/487; H02M 7/5387; H02M 7/539
See application file for complete search history.

(56) References Cited

U.S. PATENT DOCUMENTS

| | | | |
|---|---|---|---|
| 2017/0047863 A1* | 2/2017 | Kidera | H02M 1/12 |
| 2020/0280267 A1* | 9/2020 | Restrepo | H02M 7/53871 |
| 2022/0416685 A1* | 12/2022 | Chen | H02M 7/483 |
| 2023/0053066 A1* | 2/2023 | Huang | H02M 7/487 |
| 2023/0208314 A1* | 6/2023 | Noghani | H02M 7/4837 363/132 |

FOREIGN PATENT DOCUMENTS

CN 111049412 A 4/2020

* cited by examiner

*Primary Examiner* — Gary L Laxton
(74) *Attorney, Agent, or Firm* — AP3 Law Firm PLLC

(57) ABSTRACT

A three-level converter includes a first power switch, which has a first end connected to a first DC input end and a first end of a third power switch. A second end of a second power switch is connected to a second DC input end and a second end of a fourth power switch. A connection point between a second end of the first power switch and a first end of the second power switch is a first AC output end. A connection point between a second end of the third power switch and a first end of the fourth power switch is a second AC output end. Fifth and sixth power switches are connected in series between the first AC output end and a neutral end. A seventh power switch is connected between the second AC output end and a connection point between the fifth and sixth power switches.

20 Claims, 8 Drawing Sheets

THREE-LEVEL CONVERTER AND CONTROL METHOD THEREOF

CROSS-REFERENCE TO RELATED APPLICATIONS

This application claims priority to Chinese Patent Application No. 202310704136.X, filed on Jun. 14, 2023, and entitled "THREE-LEVEL CONVERTER AND CONTROL METHOD THEREOF," which is hereby incorporated by reference herein as if reproduced in its entirety.

FIELD OF TECHNOLOGY

The present disclosure relates to the field of photovoltaic power generation, and in particular, to a three-level converter and a control method thereof.

BACKGROUND

In a photovoltaic power generation system, an inverter is an indispensable part. The inverter can convert a variable direct current (DC) voltage generated by a photovoltaic solar panel into an alternating current (AC) voltage, which can be fed back to a commercial power transmission system or provided to various electrical loads.

A household photovoltaic inverter in North America needs to have split-phase commutation in working, that is, it can output two independent AC voltages with a phase staggered 180°. As shown in FIG. 1, a photovoltaic inverter 11 includes three output ports L1, L2 and N, wherein the output ports L1 and L2 are live wire ports, the output port N is a neutral wire port, a voltage between the output ports L1 and L2 is twice that between the output ports L1 and N, or a voltage between the output ports L1 and L2 is twice that between the output ports L2 and N. A load 1 is connected between the output ports L1 and N, and power is supplied to the load 1 through the voltage between the output ports L1 and N; a load 2 is connected between the output ports N and L2, and power is supplied to the load 2 through the voltage between the output ports L2 and N; and a load 3 is connected between the output ports L1 and L2, and power is supplied to the load 3 through the voltage between the output ports L1 and L2.

It is explained below that, by taking the voltage between the output ports L1 and L2 being 240V as an example, when the photovoltaic inverter 11 outputs in an off-grid manner, the photovoltaic inverter 11 can output two phases of 120V, that is, the voltage between the output ports L1 and N is 120V, which can supply power 120V to the load 1, and the voltage between the output ports L2 and N is 120V, which can supply power 120V to the load 2, and power 240V can also be supplied to the load 3. When the photovoltaic inverter 11 outputs in an off-grid manner, the load 1 and load 2 are not necessarily the same, so that the photovoltaic inverter 11 needs to control the voltages of these two phases independently. When the photovoltaic inverter 11 is connected to the grid, an output voltage of the photovoltaic inverter 11 is 240V. The load-balancing problem needs to be balanced by the grid, and the inverter itself cannot be made balance adjustment, so that it is not necessary to connect the output port N of the photovoltaic inverter 11 to the N neutral wire of the power grid. At this time, it is considered that the photovoltaic inverter 11 is an ordinary single-phase inverter.

The existing grid-connected and off-grid photovoltaic inverters have the following problems that it is impossible to ensure that the photovoltaic inverters are efficient both in grid-connected and off-grid states. At present, some photovoltaic inverters have higher efficiency in the grid-connected state and lower efficiency in the off-grid state, and the system generates heat greatly, while some photovoltaic inverters have lower efficiency and higher cost in the grid-connected state, but higher efficiency in the off-grid state. Therefore, it is an urgent technical problem for the industry to ensure that the photovoltaic inverter in both the grid-connected and off-grid states are efficient.

SUMMARY

The technical problem to be solved by the present disclosure is to provide a three-level converter, which can improve the efficiency in both the grid-connected and off-grid states and reduce the loss of a system.

The present disclosure provides a three-level converter, including a first DC input end, a second DC input end, a neutral end, a first power switch, a second power switch, a third power switch, a fourth power switch, a fifth power switch, a sixth power switch and a seventh power switch, wherein a first end of the first power switch is respectively connected with the first DC input end and a first end of the third power switch; a second end of the second power switch is respectively connected with the second DC input end and a second end of the fourth power switch; a connection point between a second end of the first power switch and a first end of the second power switch serves as a first AC output end; a connection point between a second end of the third power switch and a first end of the fourth power switch serves as a second AC output end; the fifth power switch and the sixth power switch are connected in series between the first AC output end and the neutral end; and the seventh power switch is connected between a connection point between the fifth power switch and the sixth power switch and the second AC output end.

Furthermore, the first power switch, the second power switch, the third power switch and the fourth power switch are high-frequency switching tubes; and the fifth power switch, the sixth power switch and the seventh power switch are power-frequency freewheeling tubes.

Furthermore, when the three-level converter works in an off-grid mode, a first load is connected between the first AC output end and the neutral end, and a second load is connected between the second AC output end and the neutral end.

Furthermore, when the three-level converter works in a grid-connected mode, a power grid is connected between the first AC output end and the second AC output end.

Furthermore, a first end of the fifth power switch is respectively connected with a first end of the sixth power switch and a first end of the seventh power switch.

Furthermore, a second end of the fifth power switch is respectively connected with a second end of the sixth power switch and a second end of the seventh power switch.

Furthermore, when the three-level converter works in a first half cycle, the second power switch and the third power switch are normally off and the fifth power switch is normally on, the first power switch and the fourth power switch are turned on or off at the same time, the sixth power switch and the seventh power switch are turned on or off at the same time, wherein the first power switch and the sixth power switch are complementarily turned on.

Furthermore, when the three-level converter works in a second half cycle, the first power switch and the fourth power switch are normally off and the seventh power switch is normally on, the second power switch and the third power switch are turned on or off at the same time, the fifth power switch and the sixth power switch are turned on or off at the same time, wherein the second power switch and the fifth power switch are complementarily turned on.

Furthermore, the three-level converter further includes a first freewheeling branch and a second freewheeling branch; the first freewheeling branch is connected between the first AC output end and the neutral end; and the second freewheeling branch is connected between the neutral end and the second AC output end.

Furthermore, a conduction direction of the first freewheeling branch is opposite to that of the second freewheeling branch.

Furthermore, the first freewheeling branch and the second freewheeling branch each includes a diode and a power switch that are connected in series.

The present application also provides a control method applied to the three-level converter, including: when the three-level converter works in a first half cycle, controlling the second power switch and the third power switch to be normally off and the fifth power switch to be normally on, the first power switch and the fourth power switch to be turned on or off at the same time, and the sixth power switch and the seventh power switch to be turned on or off at the same time, wherein the first power switch and the sixth power switch are complementarily turned on; and when the three-level converter works in a second half cycle, controlling the first power switch and the fourth power switch to be normally off and the seventh power switch to be normally on, the second power switch and the third power switch to be turned on or off at the same time, and the fifth power switch and the sixth power switch to be turned on or off at the same time, wherein the second power switch and the fifth power switch are complementarily turned on.

The three-level converter of the embodiment of the present disclosure includes a first DC input end, a second DC input end, a neutral end, a first power switch, a second power switch, a third power switch, a fourth power switch, a fifth power switch, a sixth power switch and a seventh power switch. Through the connection relationship of the power switches and the corresponding control of the power switches, the three-level converter can work in the grid-connected state or the off-grid state, the efficiency of the three-level converter in the grid-connected state and the off-grid state can be improved and the loss of the system can be reduced.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
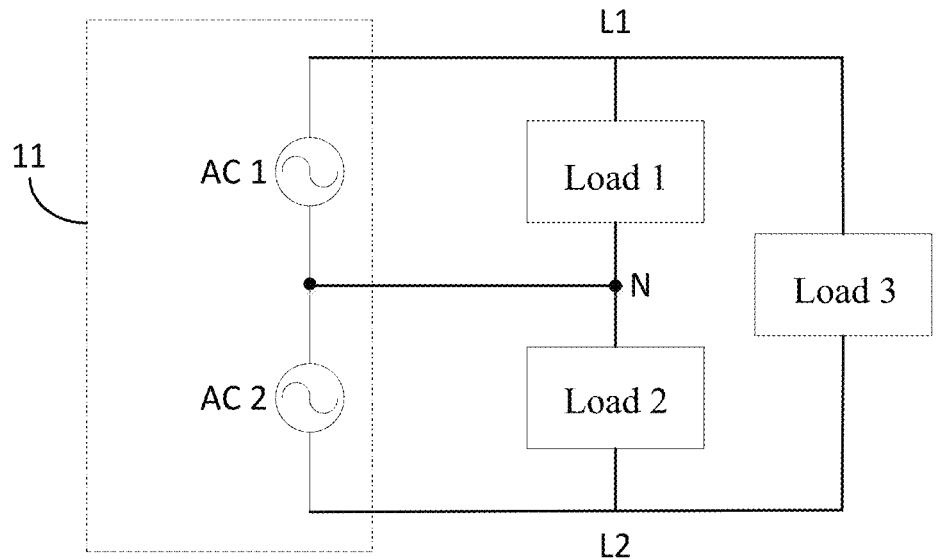
FIG. 1 is a schematic structural diagram of a photovoltaic inverter and its connection with a load in the prior art.

The technical solutions in the present disclosure will be described clearly and completely with reference to the accompanying drawings, and it is obvious that the described embodiments are some, but not all embodiments of the present disclosure. Based on the embodiments in the present disclosure, all other embodiments obtained by those of ordinary skill in the art without any creative work belong to the scope of protection of the present disclosure.

It will be understood that the present disclosure may be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity, and like reference numerals designate like elements throughout. It will be understood that when an element or layer is referred to as being "on . . . ", "adjacent to . . . ", "connected to" or "coupled to" another element or layer, it can be directly on, adjacent to, connected to or coupled to the other element or layer, or intervening elements or layers may be present. In contrast, when an element is referred to as being "directly on . . . ", "directly adjacent to . . . ", "directly connected to" or "directly coupled to" another element or layer, there is no intervening element or layer. It will be understood that, although the terms "first", "second", "third", etc. may be used to describe various elements, components, regions, layers and/or parts, these elements, components, regions, layers and/or parts should not be limited by these terms. These terms are only used to distinguish one element, component, region, layer or part from another element, component, region, layer or part. Therefore, a first element, component, region, layer or part discussed below can be referred to as a second element, component, region, layer or part without departing from the teachings of the present disclosure.

Spatial relational terms such as "beneath", "under", "following", "below", "above" and "on" can be used herein for convenience of description to describe the relationship between one element or feature shown in a figure and another element or feature. It will be understood that in addition to orientations shown in the drawings, the spatial relationship terms are intended to include different orientations of devices in use and operation. For example, if a device in the drawing is turned over, then an element or feature described as "under" or "below" or "beneath" another element will be oriented "on" the other element or feature. Thus, the exemplary terms "under" and "beneath" may include both upper and lower orientations. The device may be otherwise oriented (rotated by 90 degrees or other orientations) and the spatial descriptors used herein are interpreted accordingly.

The terms used herein are for the purpose of describing specific embodiments only and are not used as a limitation of the present disclosure. As used herein, singular forms of "a", "an" and "said/the" are also intended to include plural forms unless the context clearly indicates otherwise. It should also be understood that the terms "consisting of" and/or "comprising", when used in this description, specify the presence of said features, integers, steps, operations, elements and/or components, but do not exclude the presence or addition of one or more other features, integers, steps, operations, elements, components and/or groups. As used herein, the term "and/or" includes any and all combinations of related listed items.

Figure 2:
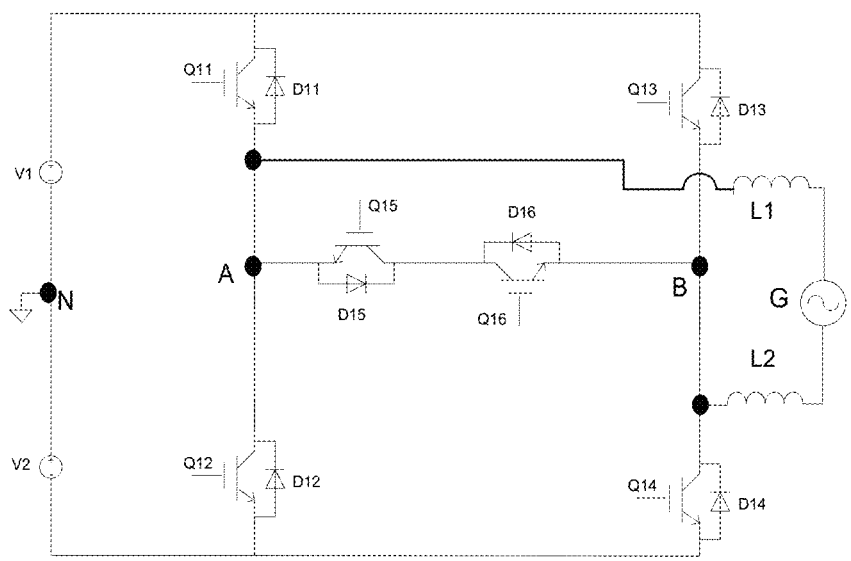
FIG. 2 is a schematic structural diagram of a single-phase inverter in the prior art working in a grid-connected mode.
Figure 3:
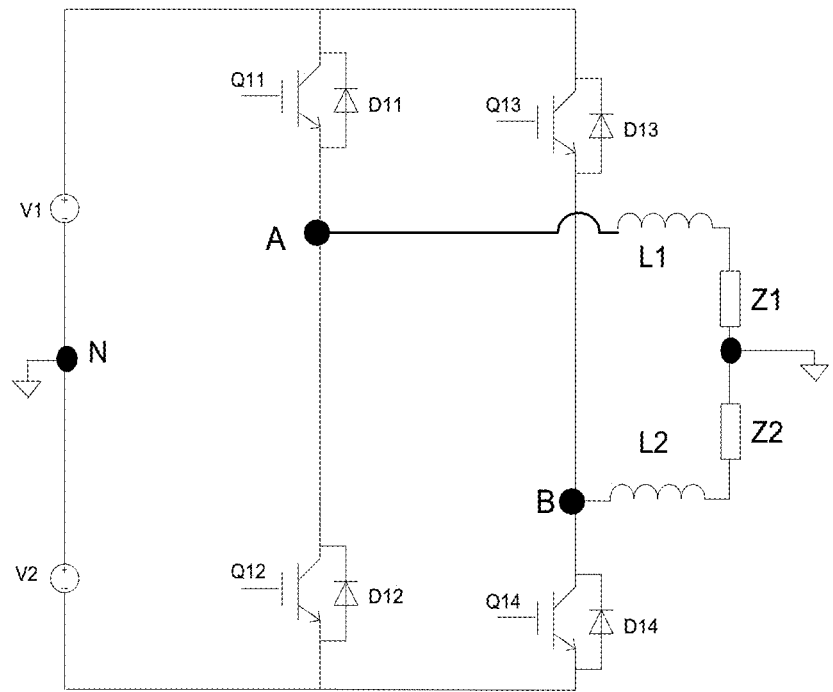
FIG. 3 is a schematic structural diagram of the inverter in FIG. 2 working in an off-grid mode.

Referring to FIG. 2 and FIG. 3, FIG. 2 is a schematic structural diagram of a single-phase inverter in the prior art working in a grid-connected mode, and FIG. 3 is a schematic structural diagram of the inverter in FIG. 2 working in an off-grid mode. The inverter includes a first input end, a neutral end N, a second input end and power switches Q11-Q16, wherein a voltage between the first input end and the neutral end N is an upper half bus voltage V1, and a voltage between the neutral end N and the second input end is a lower half bus voltage V2. A first end of the power switch Q11 is respectively connected with the power switch Q13 and the first input end; a connection point between a first end of the power switch Q12 and a second end of the power switch Q11 serves as a first AC output end A; a connection point between a second end of the power switch Q13 and a first end of the power switch Q14 serves as a second AC output end B; a second end of the power switch Q12 is respectively connected with a second end of the power switch Q14 and the second input end; the power switches Q15 and Q16 are connected in series between a first AC output end A and a second AC output end B, wherein the power switches Q15 and Q16 are bidirectional switches, that is, a first end of the power switch Q15 is connected with a first end of the power switch Q16, a second end of the power switch Q15 is connected with the second end of the power switch Q11, and a second end of the power switch Q16 is connected with the second end of the power switch Q13. In this embodiment, the power switches Q11-Q16 may be controllable switches such as IGBTs and MOSFETs, for example, the power switches Q11-Q16 are IGBTs, the first ends of the power switches Q11-Q16 are drains, and the second ends of the power switches Q11-16 are sources. The power switches Q11-Q16 include controllable switches and diodes which are antiparallel connection with the controllable switches.

Referring to FIG. 2, when the inverter works in the grid-connected mode, a power grid G is connected between the first AC output end A and the second AC output end B. The inverter further includes inductors L1 and L2, one end of the power grid G is connected with the first AC output end A through the inductor L1, and the other end of the power grid G is connected with the second AC output end B through the inductor L2.

In this embodiment, the power switches Q11-Q14 are high-frequency switching tubes, and the power switches Q15 and Q16 are power-frequency freewheeling tubes. In a positive half cycle of the power grid, a controller (not shown) is respectively connected with control ends of power switches Q11-Q16 to control the power switches Q12 and Q13 to be normally off and the power switch Q15 to be normally on, the controller controls the power switches Q11 and Q14 to be turned on or off at the same time, and the controller controls the power switches Q11 and Q16 to be complementarily turned on. In a negative half cycle of the power grid, the controller controls the power switches Q11 and Q14 to be normally off and the power switch Q16 to be normally on, the controller controls the power switches Q12 and Q13 to be turned on or off at the same time, and the controller controls the power switches Q12 and Q15 to be complementarily turned on. When a grid-connected current and voltage of the inverter are in the same phase, by taking the positive half cycle of the power grid as an example, in a case that the power switches Q11 and Q14 are turned on, an output voltage of the inverter is a bus voltage, that is, V1+V2; when the power switches Q11 and Q14 are turned off, currents on the inductors L1 and L2 flow through the power switches Q15 and Q16, and the output voltage of the inverter is 0. It can be seen that there are always 2 power switches through which the current flows in a whole loop from the input end of the inverter to the power grid at all times. This inverter cannot be used in a split-phase output mode and cannot adjust an unbalanced working condition of a split-phase two-phase load.

Referring to FIG. 3, when the inverter works in the off-grid mode, the inductor L1 and a load Z1 are connected in series between the first AC output end A and the neutral end N, and the inductor L2 and a load Z2 are connected in series between the second AC output end B and the neutral end N; and at this time, only the power switches Q11-Q14 can be used for bipolar modulation, which will obviously increase the loss of a system, lower the efficiency and increase the heat of the system.

Figure 4:
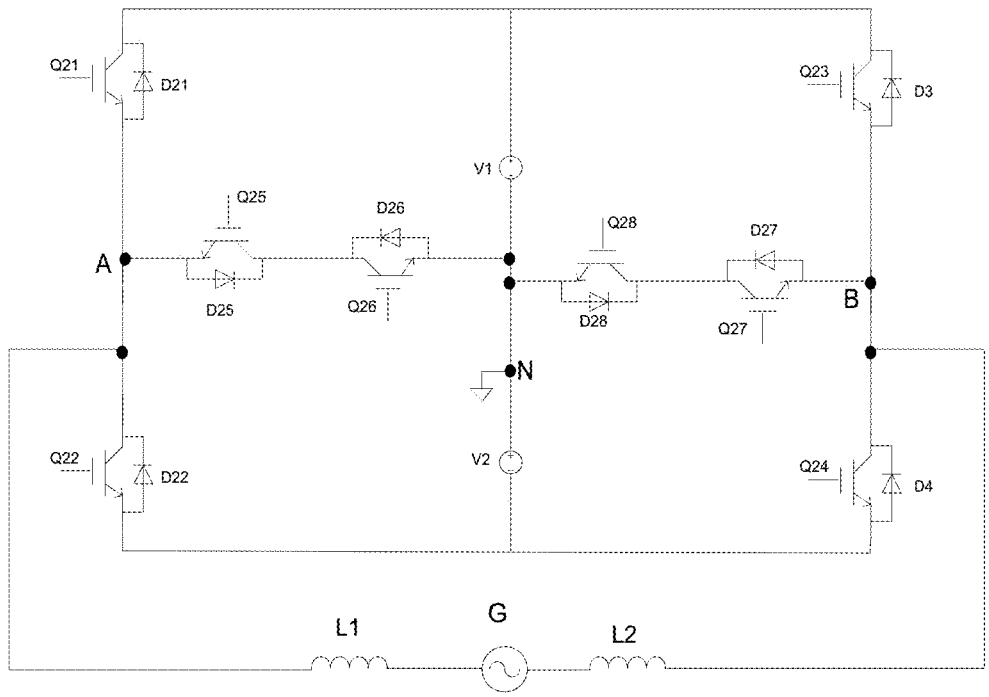
FIG. 4 is a schematic structural diagram of a T-shaped three-level inverter in the prior art working in the grid-connected mode.
Figure 5:
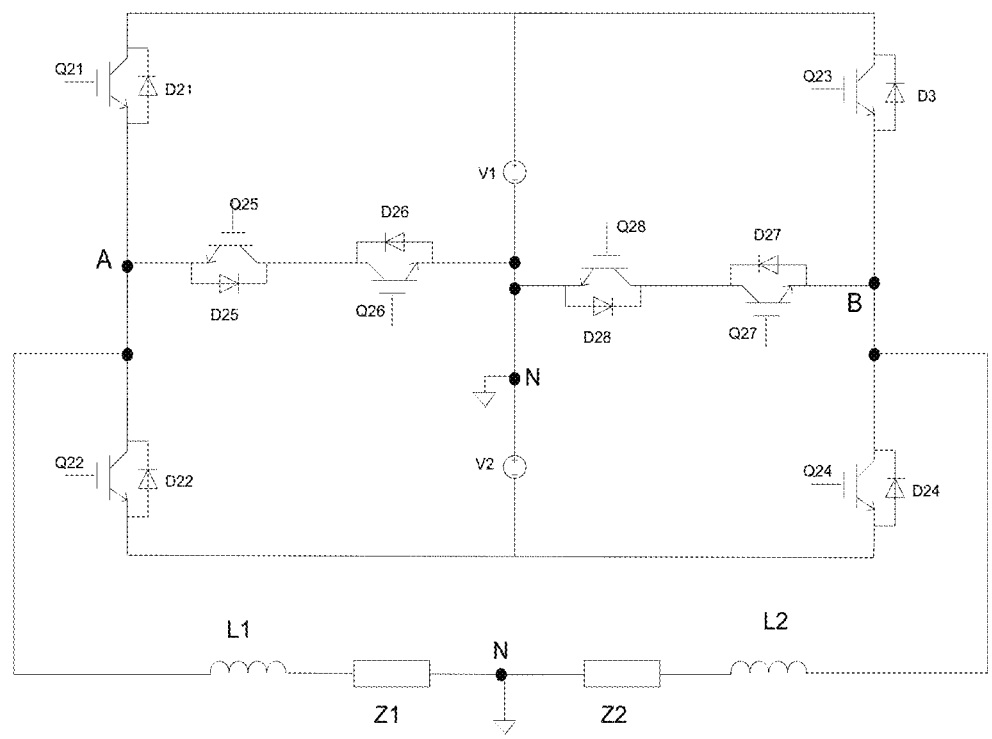
FIG. 5 is a schematic structural diagram of the inverter in FIG. 4 working in the off-grid mode.

Referring to FIG. 4 and FIG. 5, FIG. 4 is a structural schematic diagram of a T-shaped three-level inverter in the prior art working in the grid-connected mode, and FIG. 5 is a structural schematic diagram of the inverter in FIG. 4 working in the off-grid mode. The inverter includes a first input end, a neutral end N, a second input end and power switches Q21-Q27, wherein a voltage between the first input end and the neutral end N is an upper half bus voltage V1, and a voltage between the neutral end N and the second input end is a lower half bus voltage V2. A first end of the power switch Q21 is respectively connected with the first input end and a first end of the power switch Q23; a connection point between a second end of the power switch Q21 and a first end of the power switch Q22 serves as a first AC output end A; a connection point between a second end of the power switch Q23 and a first end of the power switch Q24 serves as a second AC output end B; a second end of the power switch Q22 is respectively connected with a second end of the power switch Q24 and the second input end; the power switches Q25 and Q26 are connected in series between the first AC output end A and the neutral end N; and the power switches Q27 and Q28 are connected in series between the second AC output end B and the neutral end N. In this embodiment, the power switches Q25 and Q26 are bidirectional switches, and the power switches Q27 and Q28 are bidirectional switches. In this embodiment, the power switches Q21-Q24 are high-frequency switching tubes, and the power switches Q25-Q28 are power-frequency freewheeling tubes. The power switches Q21-Q28 include controllable switches and diodes in inverse-parallel connection with the controllable switches.

Referring to FIG. 4, when the inverter works in the grid-connected mode, a power grid G is connected between the first AC output end A and the second AC output end B. The inverter further includes inductors L1 and L2, one end of the power grid G is connected with the first AC output end A through the inductor L1, and the other end of the power grid G is connected with the second AC output end B through the inductor L2.

Referring to FIG. 5, when the inverter works in the off-grid mode, the inductor L1 and a load Z1 are connected in series between the first AC output end A and the neutral end N, and the inductor L2 and a load Z2 are connected in series between the second AC output end B and the neutral end N.

In this embodiment, the inverter further includes a controller (not shown), which is respectively connected with control ends of the power switches Q21-Q28. In a positive half cycle of the power grid, the controller controls the power switches Q25 and Q28 to be normally on and the power switches Q22 and Q23 to be normally off, the controller controls the power switches Q21 and Q24 to be turned on or off at the same time, and the power switches Q26 and Q27 to be turned on or off at the same time, wherein the power switches Q21 and Q24 and the power switches Q27 and Q26 are complementarily turned on. When the power switches Q21 and Q24 are turned on, there are 2 power switches through which the current flows in the whole loop from the input end of the inverter to the power grid, and when the power switches Q26 and Q27 are turned on for current following, there are 4 power switches through which the current flows in the whole loop. This inverter, when performing current following, has 4 power switches that participate in the current following, while the inverter in FIG. 2, when performing current following, has 2 power switches that participate in the current following. It can be seen that the total consumption of the inverter in the current following is greater than the total loss of the inverter in FIG. 2 in the current following.

To sum up, when the inverter works in the grid-connected mode, the efficiency of the inverter in FIG. 2 is higher than that of the inverter in FIG. 4, and the cost of two freewheeling tubes is reduced. However, when the inverter works in the off-grid mode, the efficiency of the inverter in FIG. 2 is lower than that in FIG. 4. It can be seen that the above two inverters have their own advantages and disadvantages, and it is difficult to ensure that the inverter is efficient when working in both the grid-connected mode and the off-grid mode.

Figure 6:
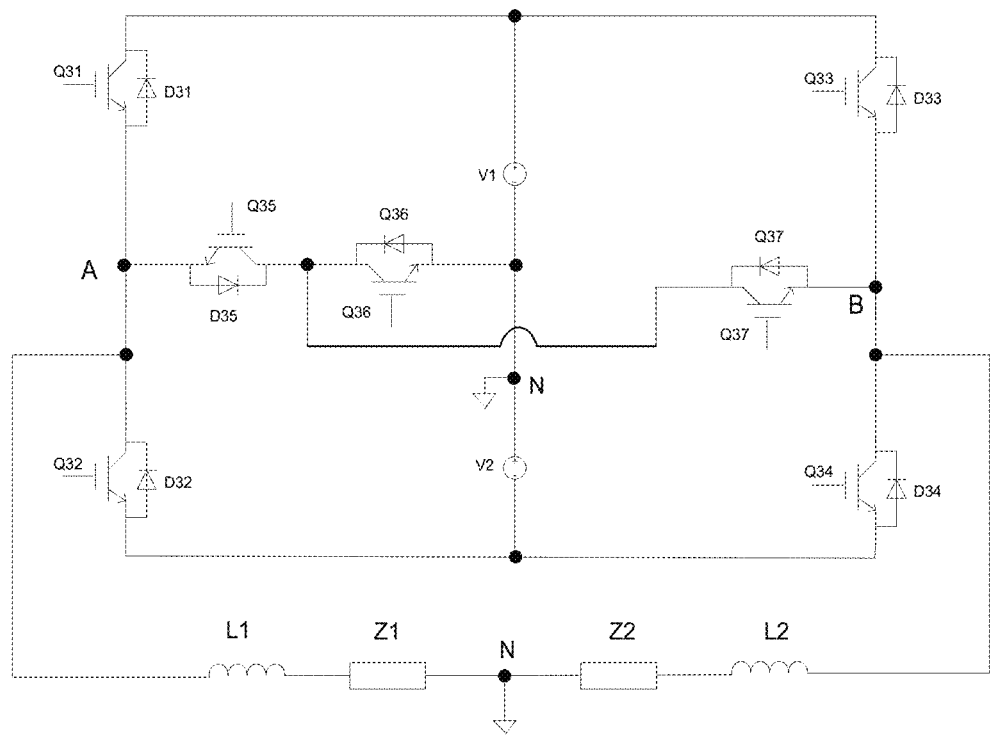
FIG. 6 is a schematic structural diagram of a three-level converter working in the off-grid mode according to an embodiment of the present application.
Figure 7:
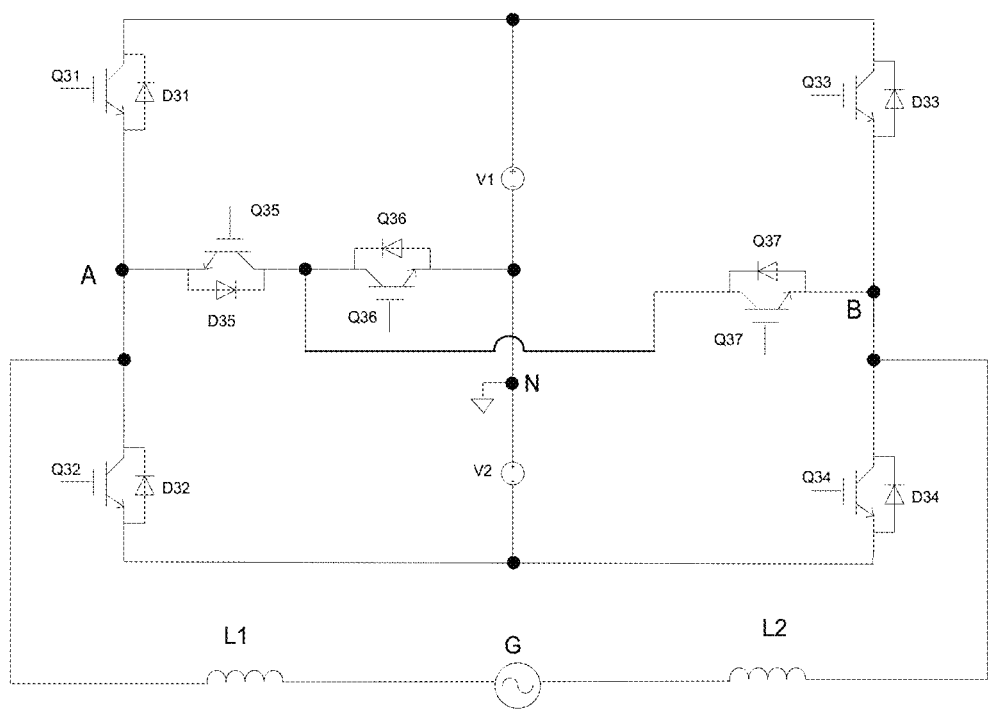
FIG. 7 is a schematic structural diagram of the three-level converter in FIG. 6 working in the grid-connected mode.

Referring to FIG. 6 and FIG. 7, FIG. 6 is a structural schematic diagram of a three-level converter working in the off-grid mode according to an embodiment of the present application, and FIG. 7 is a structural schematic diagram of the three-level converter in FIG. 6 working in the grid-connected mode. The three-level converter includes a first DC input end, a second DC input end, a neutral end N, a first power switch Q31, a second power switch Q32, a third power switch Q33, a fourth power switch Q34, a fifth power switch Q35, a sixth power switch Q36 and a seventh power switch Q37, wherein a first end of the first power switch Q31 is respectively connected with the first DC input end and a first end of the third power switch Q33; a second end of the second power switch Q32 is respectively connected with the second DC input end and a second end of the fourth power switch Q34; a connection point between a second end of the first power switch Q31 and a first end of the second power switch Q32 serves as a first AC output end A; a connection point between a second end of the third power switch Q33 and a first end of the fourth power switch Q34 serves as a second AC output end B; the fifth power switch Q35 and the sixth power switch Q36 are connected in series between the first AC output end A and the neutral end N, wherein the fifth power switch Q35 and the sixth power switch Q36 are bidirectional switches; and the seventh power switch Q37 is connected between a connection point between the fifth power switch Q35 and the sixth power switch Q36 and the second AC output end B. In this embodiment, a first end of the fifth power switch Q35 is respectively connected with a first end of the sixth power switch Q36 and a first end of the seventh power switch Q37; a second end of the fifth power switch Q35 is connected with the first AC output end A; a second end of the sixth power switch Q36 is connected with the neutral end N; and a second end of the seventh power switch Q37 is connected with the second AC output end B. In this embodiment, the first power switch Q31 to the seventh power switches Q37 include controllable switches and diodes D31-D37 in inverse-parallel connection with the controllable switches, wherein the controllable switches may be IGBTs, MOSFETs, IGCTs, etc. For example, when the controllable switches are the IGBTs, the first ends of the first power switch Q31 to the seventh power switches Q37 are drains of the IGBTs, and the second ends of the first power switch Q31 to the seventh power switches Q37 are sources of the IGBTs.

In this embodiment, the first to fourth power switches Q31-Q34 are high-frequency switching tubes, and the fifth to seventh power switches Q35-Q37 are power-frequency freewheeling tubes.

When the three-level converter works in the off-grid mode, a first load Z1 is connected between the first AC output end A and the neutral end N, wherein the first load Z1 can be connected in series with the inductor L1 and then connected between the first AC output end A and the neutral end N; a second load Z2 is connected between the second AC output end B and the neutral end N, wherein the second load Z2 can be connected in series with the inductor L2 and then connected between the second AC output end B and the neutral end N. The first load Z1 and the second load Z2 are split-phase output loads, respectively.

When the three-level inverter works in the grid-connected mode, a power grid G is connected between the first AC output end A and the second AC output end B, wherein the inductor L1 is connected between one end of the power grid G and the first AC output end A, and the inductor L2 is connected between the other end of the power grid G and the second AC output end B.

Figure 8:
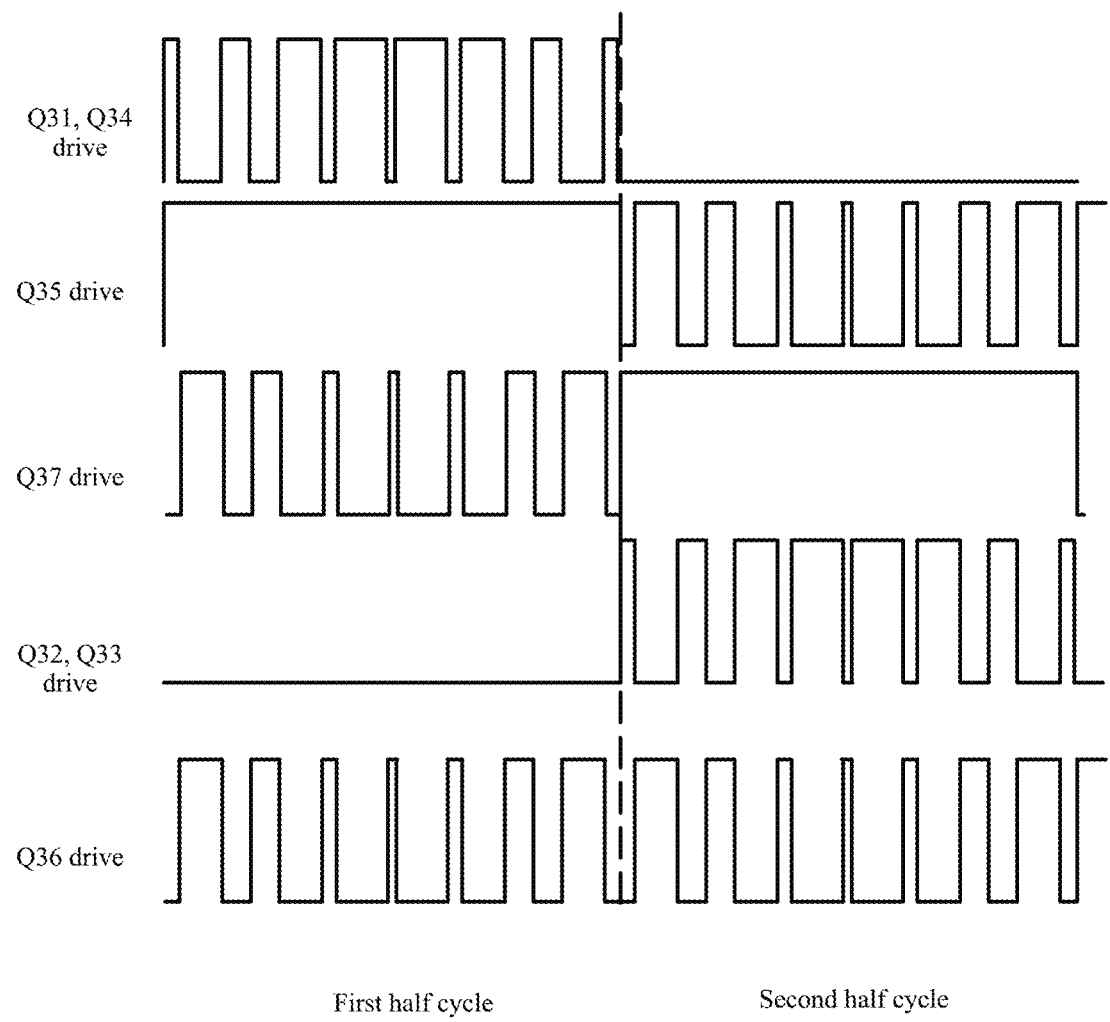
FIG. 8 is a driving waveform diagram of power switches of the three-level converter in FIG. 6 and FIG. 7.

Referring to FIG. 8, FIG. 8 is a driving waveform diagram of power switches of the three-level converter in FIG. 6 and FIG. 7. The three-level converter further includes a controller (not shown), which is connected with control ends of the first power switch Q31 to the seventh power switch Q37 and is configured to control the turn-on or turn-off of the first power switch Q31 to the seventh power switch Q37. When the three-level converter works in a first half cycle (for example, a positive half cycle of the power grid), the controller controls the second power switch Q32 and the third power switch Q33 to be normally off and the fifth power switch Q35 to be normally on, the first power switch Q31 and the fourth power switch Q34 to be turned on or off at the same time, and the sixth power switch Q36 and the seventh power switch Q37 to be turned on or off at the same time, wherein the first power switch Q31 and the sixth power switch Q36 are complementarily turned on. When the three-level converter works in a second half cycle (for example, a negative half cycle of the power grid), the controller controls the first power switch Q31 and the fourth power switch Q34 to be normally off and the seventh power switch Q27 to be normally on, the second power switch Q32 and the third power switch Q33 to be turned on or off at the same time, and the fifth power switch Q35 and the sixth power switch Q36 to be turned on or off at the same time, wherein the second power switch Q32 and the fourth power switch Q35 are complementarily turned on.

When the three-level converter works in the grid-connected mode or the off-grid mode and the two-phase loads Z1 and Z2 match, a line current on the neutral end N is 0, the current flows through the fifth power switch Q35 and the seventh power switch Q37 during the power-frequency freewheeling current, while no current flows through the sixth power switch Q36, so that there are only 2 power switches in a freewheeling loop, and the efficiency of the inverter working in the grid-connected mode as shown in FIG. 2 can be achieved. When the three-level converter works in the off-grid mode and the first load Z1 and the second load Z2 are asymmetrical, the current flows through the sixth power switch Q36. Assuming that the second load Z2 connected between the second AC output end B and a neutral point is no-load, power is output only between the first AC output end A and the neutral end N, with its path being the same as a current path of the inverter in FIG. 5.

It can be seen that the efficiency of the three-level converter in FIG. 7 working in the grid-connected mode is the same as that of the inverter in FIG. 2 working in the grid-connected mode; and the worst efficiency of the three-level converter in FIG. 6 working in the off-grid mode is the same as that of the inverter in FIG. 4 working in the off-grid mode, and the best efficiency is the same as that of the inverter in FIG. 2 working in the grid-connected mode. The three-level converter in FIG. 6 and FIG. 7 takes advantage of the inverter in FIG. 2 and FIG. 4, so that the efficiency of the three-level converter working in the off-grid mode and the grid-connected mode is improved.

Figure 9:
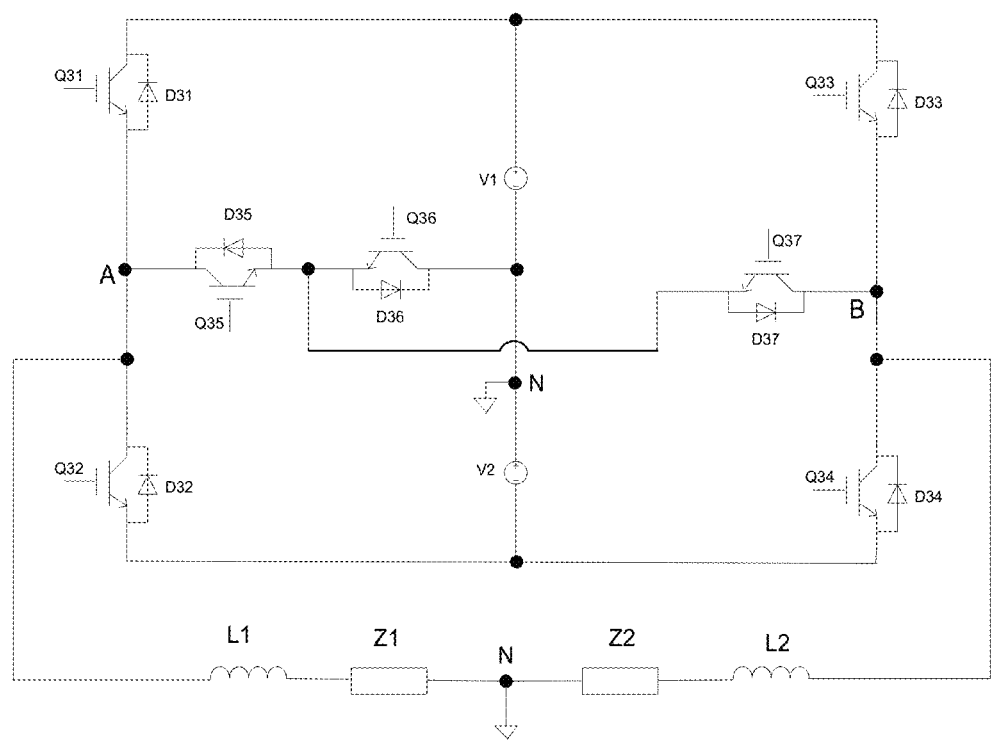
FIG. 9 is a schematic structural diagram of a three-level converter working in the off-grid mode according to another embodiment of the present application.

Referring to FIG. 9, FIG. 9 is a schematic structural diagram of a three-level converter working in the off-grid mode according to an embodiment of the present application. The structure and connection relationship of the three-level converter in FIG. 9 that are the same as those of the three-level converter in FIG. 6 are omitted here. The following mainly describes the differences between the three-level converter in FIG. 9 and the three-level converter in FIG. 6, that is, a second end of the fifth power switch Q35 is connected with a second end of the sixth power switch Q36 and a second end of the seventh power switch Q37 respectively, a first end of the fifth power switch Q35 is connected with the first AC output end A and a first end of the seventh power switch Q37 is connected with the second AC output end B.

Figure 10:
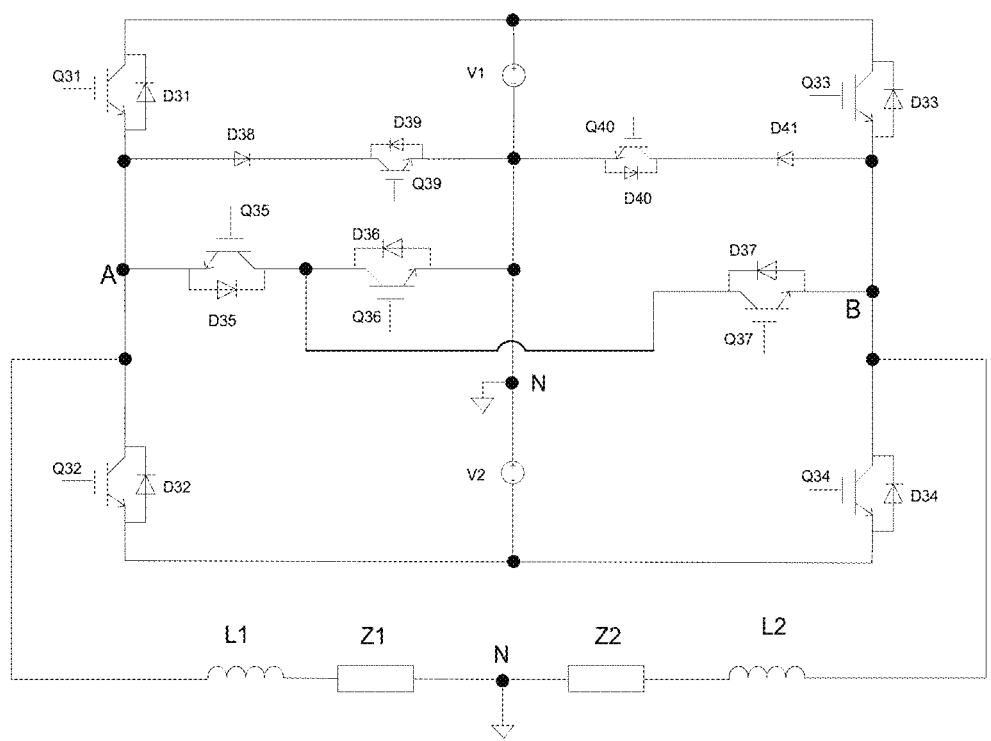
FIG. 10 is a schematic structural diagram of a three-level converter working in the off-grid mode according to yet another embodiment of the present application.
Figure 11:
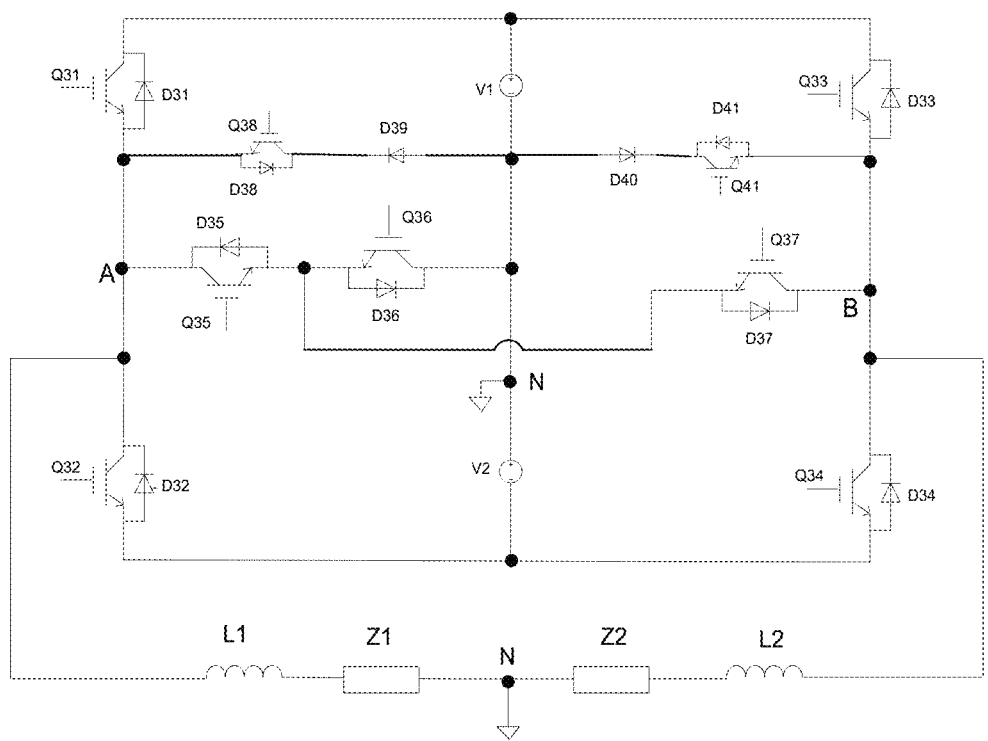
FIG. 11 is a schematic structural diagram of a three-level converter working in an off-grid mode according to yet another embodiment of the present application.

Referring to FIG. 10 and FIG. 11, FIG. 10 is a structural schematic diagram of a three-level converter working in an off-grid mode according to an embodiment of the present application, and FIG. 11 is a structural schematic diagram of a three-level converter working in the off-grid mode according to a fourth embodiment of the present disclosure. The three-level converter further includes a first freewheeling branch and a second freewheeling branch; the first freewheeling branch is connected between the first AC output end A and the neutral end N; and the second freewheeling branch is connected between the neutral end N and the second AC output end B. As shown in FIG. 10, the first freewheeling branch includes a diode D38 and a power switch Q39 that are connected in series, wherein an anode of the diode D38 is connected with the first AC output end A, a cathode of the diode D38 is connected with a first end of the power switch Q39, and a second end of the power switch Q39 is connected with the neutral end N. The second freewheeling branch includes a power switch Q40 and a diode D41 that are connected in series, a second end of the power switch Q40 is connected with the neutral end N, a first end of the power switch Q40 is connected with a cathode of the diode D41, and an anode of the diode D41 is connected with the second AC output end B. It should be noted that the diodes D38 and D41 can be replaced by controllable switches. As shown in FIG. 11, the first freewheeling branch includes a diode D39 and a power switch Q38 that are connected in series, wherein a second end of the power switch Q38 is connected with the first AC output end A, a first end of the power switch Q38 is connected with a cathode of the diode D39, and an anode of the diode D39 is connected with the neutral end N. The second freewheeling branch includes a power switch Q41 and a diode D40 that are connected in series, an anode of the diode D40 is connected with the neutral end N, a cathode of the diode D40 is connected with a first end of the power switch Q41, and a second end of the power switch Q41 is connected with the second AC output end B. It can be seen that a conduction direction of the first freewheeling branch is opposite to that of the second freewheeling branch. With the adoption of the first freewheeling branch and the second freewheeling branch, the three-level converter can provide a temporary follow current pathway through the first freewheeling branch or the second freewheeling branch during the dead time from the turn-off of the second power switch Q32 and the fourth power switch Q34 to the turn-on of the fifth power switch Q35 to the power switch Q37, so that the three-level converter is more reliable and safer.

Referring to FIG. 6, FIG. 8 and FIG. 10, the working principle of the three-level converter is as follows:

When the three-level converter works in a first cycle, the first power switch Q31 and the fourth power switch Q34 are turned on, and the first DC input end, the first power switch Q31, the first load Z1 and the neutral end N form a current pathway, and the second DC input end, the neutral end N, the fourth power switch Q34 and the second load Z2 form a current pathway. When the first power switch Q31 and the fourth power switch Q34 are turned off and the sixth power switch Q36 and the seventh power switch Q37 have not yet been turned on, the neutral end N, the second load Z2, the power switch Q40 and the diode D41 form a freewheeling pathway; the diode D36, the power switch Q35, the neutral end N and the first load Z1 form a freewheeling pathway; after the sixth power switch Q36 and the seventh power switch Q37 are turned on, the seventh power switch Q37, the sixth power switch Q36, the neutral end N and the second load Z2 form a freewheeling pathway; and the sixth power switch Q36, the fifth power switch Q35, the first load Z1 and the neutral end N form a freewheeling pathway.

When the three-level converter works in a second cycle, the second power switch Q32 and the third power switch Q33 are turned on, and the second power switch Q32, the second DC input end, the neutral end N and the first load Z1 form a current pathway; and the first DC input end, the third power switch Q33, the second load Z2 and the neutral end N form a current pathway. When the second power switch Q32 and the third power switch Q33 are turned off and the sixth power switch Q36 and the fifth power switch Q35 have not yet been turned on, the neutral end N, the second load Z2, the power switch Q37 and the diode D36 form a freewheeling pathway; the diode D38, the power switch Q39, the neutral end N and the first load Z1 form a freewheeling pathway; after the sixth power switch Q36 and the fifth power switch Q35 are turned on, the sixth power switch Q36, the seventh power switch Q37, the second load Z2 and the neutral end N form a freewheeling pathway; and the fifth power switch Q35, the sixth power switch Q36, the neutral end N and the first load Z1 form a freewheeling pathway.

It can be seen that with the adoption of the first freewheeling branch and the second freewheeling branch, the three-level converter can provide a temporary freewheeling pathway through the first freewheeling branch or the second freewheeling branch during the dead time from the turn-off of the second power switch Q32 and the fourth power switch Q34 to the turn-on of the fifth power switch Q35 to the power switch Q37, so that the three-level converter is more reliable and safer.

FIG. 11 is a schematic structural diagram of a three-level converter working in an off-grid mode according to still another embodiment of the present application. The working principle of the three-level converter in FIG. 11 is similar to that in FIG. 10, which is omitted here.

In an embodiment of the present disclosure, there is provided a control method applied to the three-level converter above. The control method includes:

when the three-level converter works in a first half cycle, controlling the second power switch Q32 and the third power switch Q33 to be normally off and the fifth power switch Q35 to be normally on, the first power switch Q31 and the fourth power switch Q34 to be turned on or off at the same time, and the sixth power switch Q36 and the seventh power switch Q37 to be turned on or off at the same time, wherein the first power switch Q31 and the sixth power switch Q36 are complementarily turned on; and when the three-level converter works in a second half cycle, controlling the first power switch Q31 and the fourth power switch Q34 to be normally off and the seventh power switch Q37 to be normally on, the second power switch Q32 and the third power switch Q33 to be turned on or off at the same time, and the fifth power switch Q35 and the sixth power switch Q36 to be turned on or off at the same time, wherein the second power switch Q32 and the fourth power switch Q35 are complementarily turned on.

According to the embodiments above, the efficiency of the three-level converter working in the off-grid mode and the grid-connected mode is improved.

Finally, it should be noted that the above embodiments are only used to illustrate the technical solutions of the present disclosure, and not to limit the same; while the present disclosure has been described in detail with reference to the foregoing embodiments, it will be understood by those skilled in the art that the technical solutions described in the foregoing embodiments may still be modified, or some or all of the technical features may be equivalently substituted; and these modifications or substitutions do not make the essence of the corresponding technical solutions deviate from the scope of the technical solutions of various embodiments of the present disclosure.

What is claimed is:

1. A three-level converter, comprising:
a first direct current (DC) input end, a second DC input end, a neutral end, a first power switch, a second power switch, a third power switch, a fourth power switch, a fifth power switch, a sixth power switch and a seventh power switch; and wherein a first end of the first power switch is connected to the first DC input end and a first end of the third power switch, respectively;

a second end of the second power switch is connected to the second DC input end and a second end of the fourth power switch, respectively;

a connection point between a second end of the first power switch and a first end of the second power switch serves as a first alternating current (AC) output end of the three-level converter; a connection point between a second end of the third power switch and a first end of the fourth power switch serves as a second AC output end of the three-level converter; and the fifth power switch and the sixth power switch are connected in series between the first AC output end and the neutral end; and the seventh power switch is connected between the second AC output end and a connection point between the fifth power switch and the sixth power switch.

2. The three-level converter according to claim 1, wherein the first power switch, the second power switch, the third power switch and the fourth power switch are high-frequency switching tubes; and the fifth power switch, the sixth power switch and the seventh power switch are power-frequency freewheeling tubes.

3. The three-level converter according to claim 1, wherein when the three-level converter works in an off-grid mode, a first load is connected between the first AC output end and the neutral end, and a second load is connected between the second AC output end and the neutral end.

4. The three-level converter according to claim 1, wherein when the three-level converter works in a grid-connected mode, a power grid is connected between the first AC output end and the second AC output end.

5. The three-level converter according to claim 1, wherein a first end of the fifth power switch is connected to a first end of the sixth power switch and a first end of the seventh power switch, respectively.

6. The three-level converter according to claim 1, wherein a second end of the fifth power switch is connected to a second end of the sixth power switch and a second end of the seventh power switch, respectively.

7. The three-level converter according to claim 1, wherein when the three-level converter works in a first half cycle, the second power switch and the third power switch are normally off and the fifth power switch is normally on, the first power switch and the fourth power switch are turned on or off at same time, the sixth power switch and the seventh power switch are turned on or off at same time, and the first power switch and the sixth power switch are complementarily turned on.

8. The three-level converter according to claim 7, wherein when the three-level converter works in a second half cycle, the first power switch and the fourth power switch are normally off and the seventh power switch is normally on, the second power switch and the third power switch are turned on or off at same time, the fifth power switch and the sixth power switch are turned on or off at same time, and the second power switch and the fifth power switch are complementarily turned on.

9. The three-level converter according to claim 1, further comprising:
a first freewheeling branch and a second freewheeling branch, wherein the first freewheeling branch is connected between the first AC output end and the neutral end, and the second freewheeling branch is connected between the neutral end and the second AC output end.

10. The three-level converter according to claim 9, wherein a conduction direction of the first freewheeling branch is opposite to that of the second freewheeling branch.

11. The three-level converter according to claim 9, wherein the first freewheeling branch and the second freewheeling branch each comprises a diode and a power switch that are connected in series.

12. A control method applied to the three-level converter according to claim 1, the control method comprising:
controlling, by the three-level converter in a first half cycle, the second power switch and the third power switch to be normally off and the fifth power switch to be normally on, the first power switch and the fourth power switch to be turned on or off at same time, and the sixth power switch and the seventh power switch to be turned on or off at same time, wherein the first power switch and the sixth power switch are complementarily turned on; and
controlling, by the three-level converter in a second half cycle, the first power switch and the fourth power switch to be normally off and the seventh power switch to be normally on, the second power switch and the third power switch to be turned on or off at same time, and the fifth power switch and the sixth power switch to be turned on or off at same time, wherein the second power switch and the fifth power switch are complementarily turned on.

13. The control method according to claim 12, wherein in the three-level converter, the first power switch, the second power switch, the third power switch and the fourth power switch are high-frequency switching tubes; and the fifth power switch, the sixth power switch and the seventh power switch are power-frequency freewheeling tubes.

14. The control method according to claim 12, wherein when the three-level converter works in an off-grid mode, a first load is connected between the first AC output end and the neutral end, and a second load is connected between the second AC output end and the neutral end.

15. The control method according to claim 12, wherein when the three-level converter works in a grid-connected mode, a power grid is connected between the first AC output end and the second AC output end.

16. The control method according to claim 12, wherein in the three-level converter, a first end of the fifth power switch is connected to a first end of the sixth power switch and a first end of the seventh power switch, respectively.

17. The control method according to claim 12, wherein in the three-level converter, a second end of the fifth power switch is connected to a second end of the sixth power switch and a second end of the seventh power switch, respectively.

18. The control method according to claim 12, wherein the three-level converter further comprises:
a first freewheeling branch and a second freewheeling branch, wherein the first freewheeling branch is connected between the first AC output end and the neutral end, and the second freewheeling branch is connected between the neutral end and the second AC output end.

19. The control method according to claim 18, wherein a conduction direction of the first freewheeling branch is opposite to that of the second freewheeling branch.

20. The control method according to claim 18, wherein the first freewheeling branch and the second freewheeling branch each comprises a diode and a power switch that are connected in series.

* * * * *